United States Patent Office 3,345,817
Patented Oct. 10, 1967

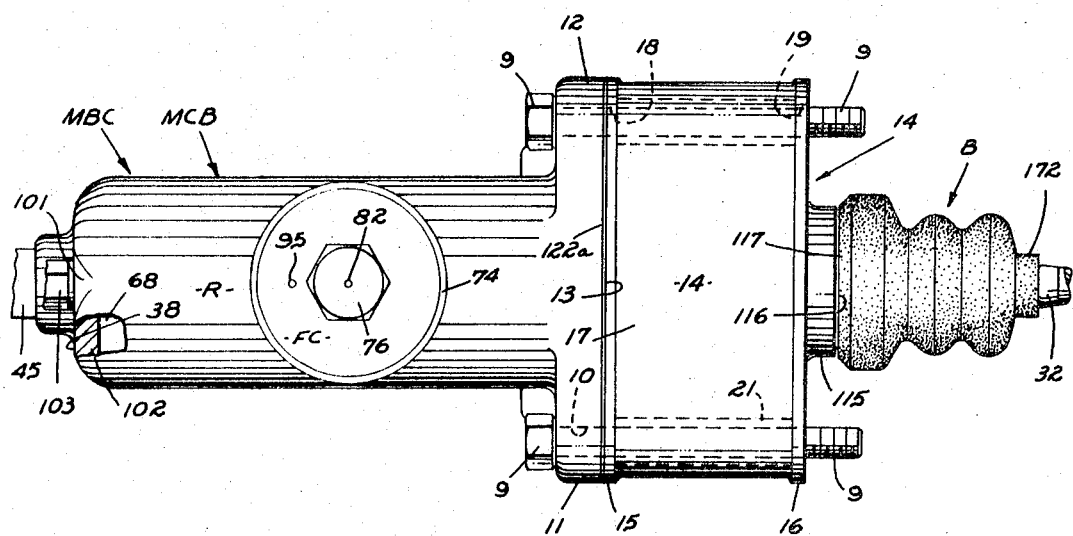
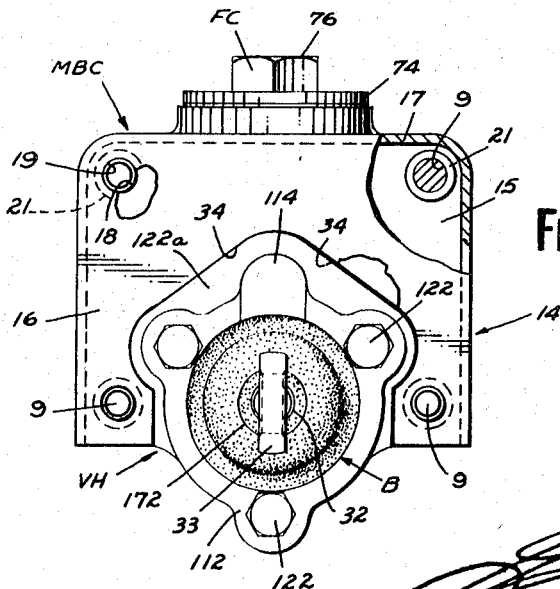

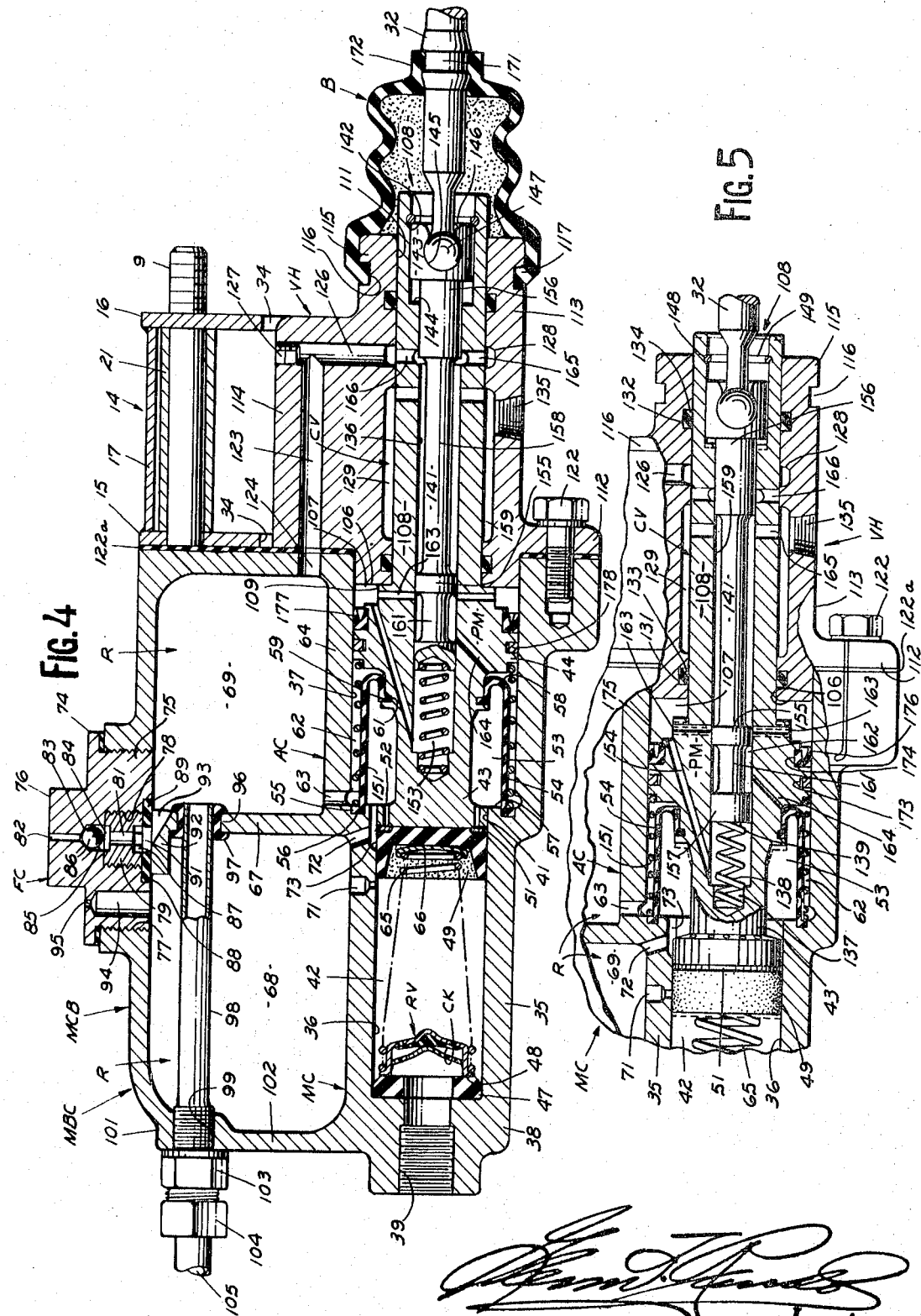

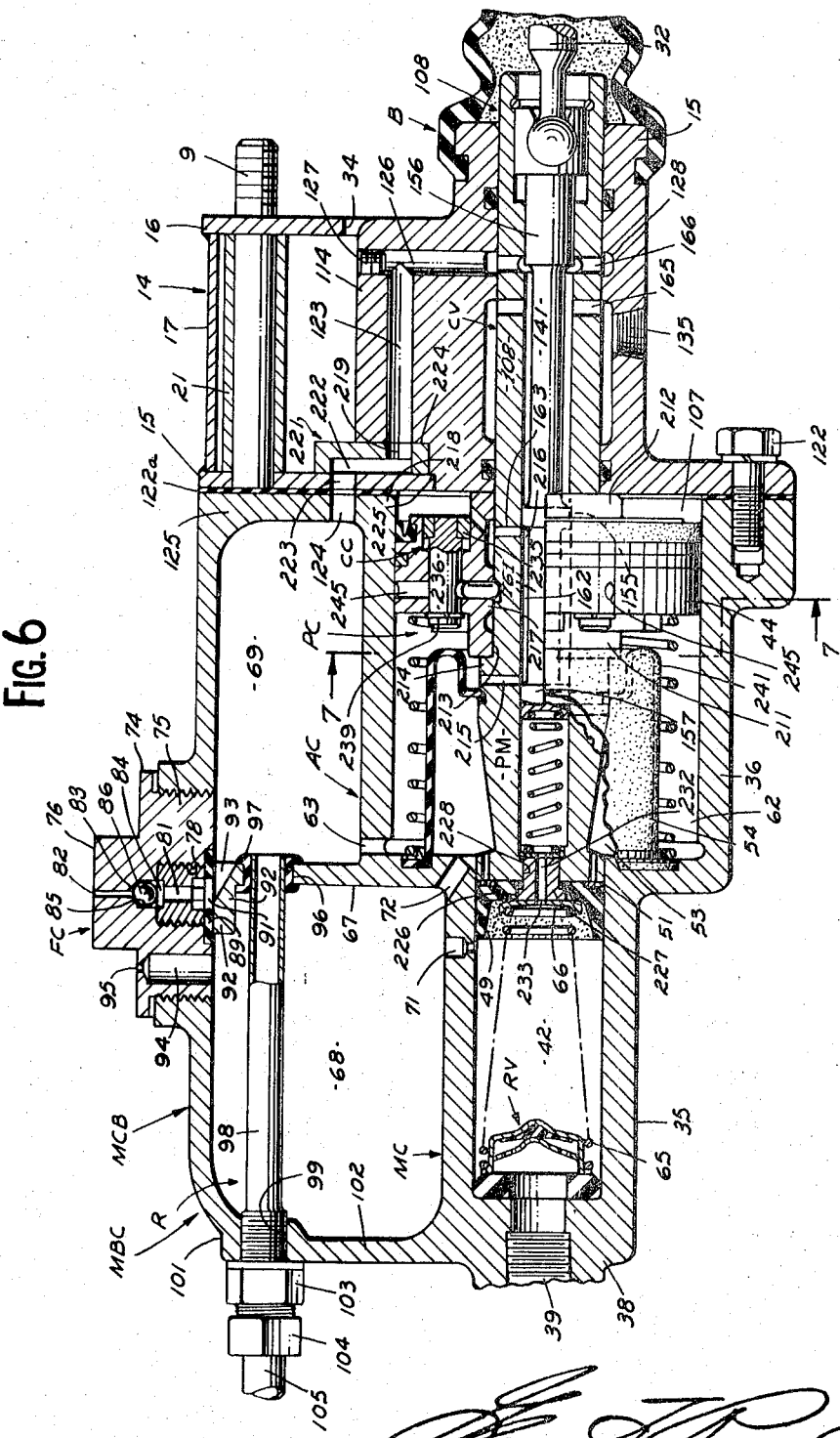

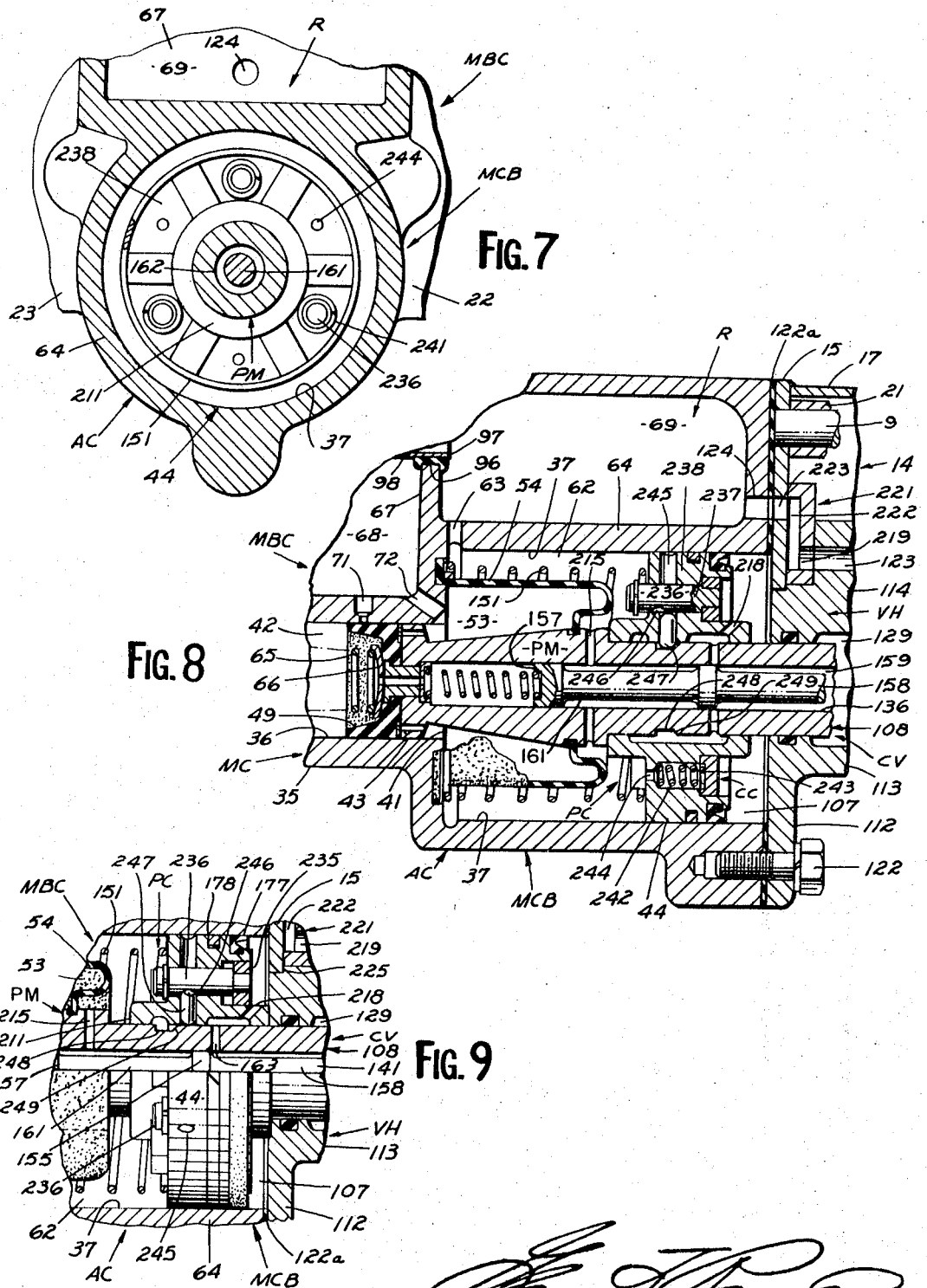

3,345,817
HYDRAULIC POWER-ASSISTED MASTER BRAKE CYLINDER
Glenn T. Randol, 3 E. 2nd Ave., Loch Lynn, P.O. Box 275, Mountain Lake Park, Md. 21550
Filed July 15, 1965, Ser. No. 472,161
26 Claims. (Cl. 60—54.6)

My invention relates to a power-assisted unit adapted to provide the major portion of the operating force to apply the brakes on automotive vehicles and the like, said invention having particular reference to a novel and improved hydraulically-actuated master brake cylinder preferably deriving pressurized oil for its actuation from the engine-driven oil pump and wherein the lubricating oil for the working parts of the engine is suitably isolated from the brake-fluid in the hydraulic brake system.

The primary objective of my invention is to provide a simplified and improved manual and/or power-assisted master brake cylinder for use in automotive hydraulic brake systems wherein the master brake cylinder includes a hydraulic-actuator cylinder therefor and arranged as a unitary structure for mounting in operating position on the engine side of the vehicle firewall, for control by the conventional suspended-type brake pedal conveniently located in the driver's compartment, said master cylinder being adapted to utilize for its actuation pressurized oil supplied by the engine-driven oil pump or, optionally, the brake-fluid in the brake system under pressurization by a fluid circulating pump operable independently of said oil pump.

Another object of the invention is to provide a master brake cylinder of the type under consideration which is characterized by a two-section body (housing), with one of said body sections comprising the master brake and actuator cylinders in coaxial relationship with an integral two-compartment supply reservoir containing oil and brake-fluid, respectively, communicating with said cylinders, respectively, and the other body section being detachably mounted on the one section to close the open end of the actuator cylinder and to provide a valve housing processed with a longitudinal bore coaxial with said cylinders, and which receives a tubular valve extension projecting coaxially from the actuator piston reciprocably disposed in said actuator cylinder, to produce an annular variable pressure control chamber, said other body section also including fluid passage means communicating with the pressure output side of said oil pump and with the reservoir compartment serving said actuator cylinder.

Another object related to the object next above is the novel utilization of a piston-carrying member comprising the aforesaid actuator piston and tubular valve extension in axially spaced relation to a piston reciprocably disposed in said master cylinder for pressurizing the brake-fluid to operate the vehicle brakes, said valve extension providing an outer valve element in which an elongated inner valve element (piston) slidably moves to produce novel control valve means for said actuator piston, said valve means including a plurality of cooperating passages and control lands on said valve elements, respectively, whereby normal relative disposition of said valve elements enables the oil to circulate through said passages into the reservoir compartment serving the actuator cylinder and back to the oil sump for re-circulation, and in a different relative disposition of the valve elements, pressurized oil is delivered into said control chamber to actuate said actuator piston to effect corresponding actuation of the master cylinder piston to apply the vehicle brakes.

Another object of the invention is to provide a combined master brake cylinder and an actuator cylinder therefor characterized by a two-compartment oil and brake-fluid supply reservoir for said cylinders, respectively, and wherein a detachable filler cap common to both compartments is provided with a pair of vents to the atmosphere with the vent associated with the compartment serving the actuator cylinder controlled by a floating check-valve element to prevent overflow and/or compressive effects when the oil in said compartment is under turbulence (surge) during non-activating circulation of the oil when the vehicle brakes are "off."

Still another object of the invention is to provide combined spring and diminutive hydraulic reaction from either the master or actuator cylinder, on the valve control member operated by the brake-pedal for providing the driver with an awareness (physical perception) of the total braking force effective at any given position of the brake-pedal.

Another object of the invention seeks to provide novel utilization of the engine-driven oil pump which normally supplies pressurized lubrication to the working parts of the engine, for also supplying actuating oil under pressure for operating in part the master brake cylinder, and wherein said actuating oil is controlled by a pressure relief valve interposed in the oil gallery to open at a desired maximum pressure, and in addition, a minimum pressure lubrication valve is set to open at a predetermined lower pressure, is incorporated in the pressure output line leading to the control valve means for the actuator cylinder, and which insures that engine lubricating requirements are met before any oil can be diverted for actuating said actuator cylinder for said master cylinder.

Another salient feature of my invention is the provision of a flexible roll-type partition diaphragm between the master and actuator cylinders for maintaining the engine oil separated from the brake-fluid in the master cylinder and connected hydraulic brake system, said diaphragm being adapted to axially contract and elongate in accordance with the reciprocating movements, respectively, of the actuator piston in operating the master brake cylinder. Another object is to eliminate said diaphragm where a common actuating fluid is used for both the master cylinder and the actuator cylinder therefor, the latter arrangement requiring an engine-driven pump and fluid supply reservoir therefor separate from the engine-driven lubricating pump.

Another object of the invention is the provision of a push-rod connection between the outer end of the slidable valve control element of the control valve means, and the brake operating pedal.

Another object is the provision of an adapter member for mounting the master brake cylinder as a unit on the vehicle firewall in the engine compartment or other suitable location convenient to the driver.

Another object of the invention is to provide a diminutive hydraulic reaction on the forward end of the slidable valve control element, proportional to the actuating pressure effective against the actuator piston. An optional, hydraulic reaction means provides a diminutive pressure reaction on the forward end of the valve control element, proportional to the effective pressure in the brake system.

A modified form of the invention incorporates a fluid-pressure engageable clutch between the actuator piston and a piston-carrying member whereby the pressure initially effective in the actuator cylinder control chamber actuates said clutch to lock said piston and member to move as a unit prior to actuation of the actuator piston to assist in applying the vehicle brakes. In the event of loss of pressurized fluid, said clutch automatically disengages under spring pressure to disconnect said actuator piston from said piston-carrying member to enable the latter to be operated independently of said actuator piston free of frictional drag and opposition from the piston return spring, solely under operator-actuation, thereby providing an operator-operated master cylinder requiring substantially the same manual input effort as that utilized by any commercial foot-operated master cylinder, said piston return spring being effective to bias the actuator piston after being declutched, toward its normal position wherein interference with manual movement of the piston-carrying member is obviated.

With these and other objects and advantages in view, the invention consists of the new and novel combinations, constructions, and arrangements of the elements as will be hereinafter more fully described, set forth in the claims appended hereto, and illustrated in the drawing wherein:

FIGURE 2 is a plan view of the master brake cylinder per se on an enlarged scale in normally relaxed condition corresponding to the dashed line position of the operator-operated member (brake-pedal) shown in FIGURE 1;

FIGURE 3 is a rear elevation on the same scale as FIGURE 2 showing the mounting bracket and studs;

FIGURE 4 is a vertical-longitudinal section on an enlarged scale of the master brake cylinder per se shown in FIGURE 1 but showing the adjusted relative positions of the parts corresponding to brake-released condition indicated by the dashed line position of the brake-pedal in the latter figure;

FIGURE 5 is a fragmentary sectional view taken from FIGURE 4 on the same scale and showing the adjusted relative disposition of the parts corresponding to the solid line position of the brake-pedal in FIGURE 1 wherein the vehicle brakes are applied;

Figure 1:
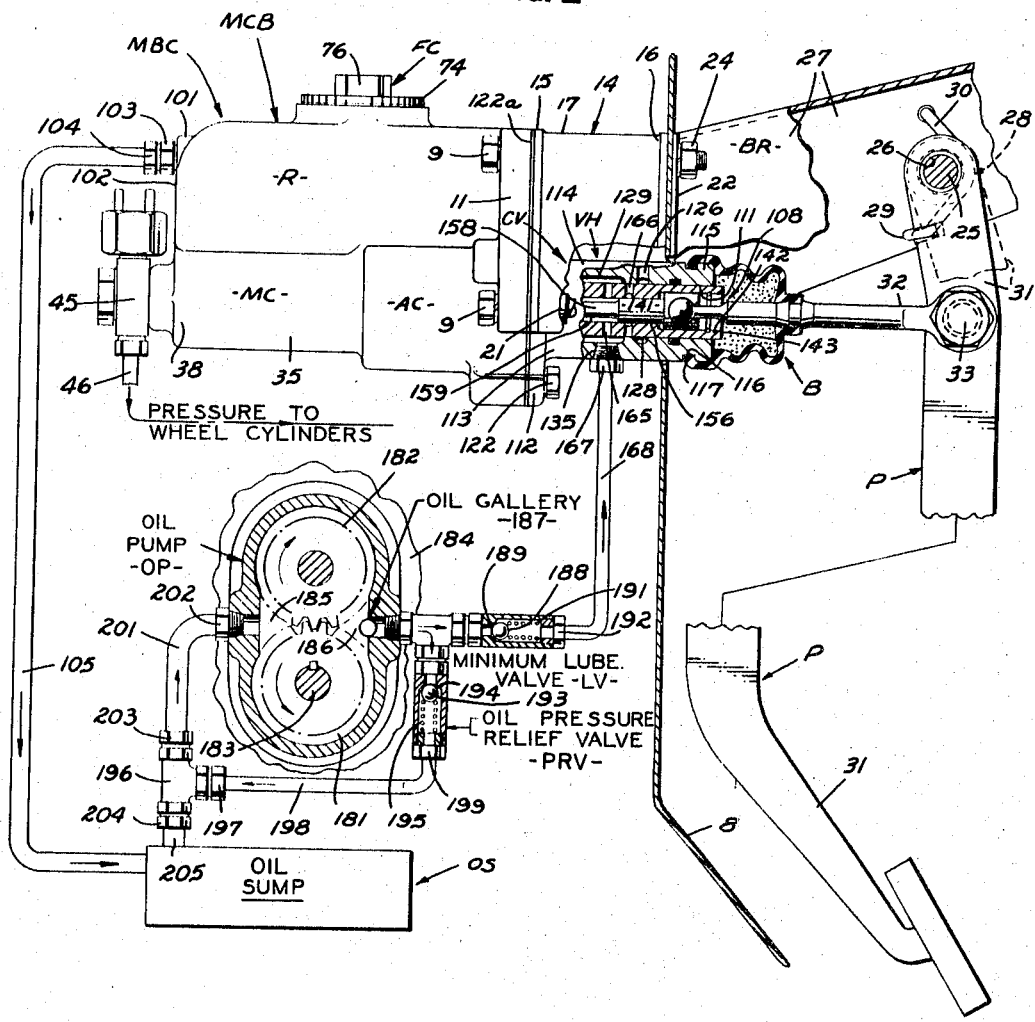
FIGURE 1 is a schematic view including a side elevation partly in section of my improved master brake cylinder embodying the principles of the present invention, and which is exemplarily shown connected to operate the hydraulic brake system conventionally used on motor vehicles and the like, the parts being disposed in relative positions corresponding to brake-applied condition.

FIGURE 6 is a sectional view similar to FIGURE 4 but showing a modified form of the invention wherein a fluid-pressure operated clutch is incorporated between the actuator piston and piston-carrying member to lock said piston and member to move as a unit under influence of pressurized oil effective against said piston to operate the vehicle brakes "on" and "off," said clutch being operable to locking position prior to actuation of said actuator piston;

FIGURE 7 is a transverse sectional view taken along the line 7—7 of FIGURE 6 to show particulars of the interlock actuating plungers actuatable by the clutch piston;

FIGURE 8 is a fragmentary view of FIGURE 6 showing the relative disposition of the parts when the clutch is in locking position and the actuator piston moving to effect operation of the master brake cylinder to apply the vehicle brakes; and FIGURE 9 is another fragmentary view similar to FIGURE 8 but showing the relative disposition of the parts with the clutch disengaged (disconnected) under spring pressure due to loss of pressurized oil and thereby enabling the actuator piston to return to its normal position under influence of its return spring for independent movement of the piston-carrying member and master cylinder piston solely under operator-actuation to pressurize the brake-fluid in the master cylinder for braking operations without spring and frictional opposition from the actuator piston.

Like characters of reference designate like and similar parts in the several views.

Referring now to the drawing, and particularly to FIGURES 1, 2, 3, and 4, I have used the reference character MBC to designate as a whole my novel and improved hydraulic-assisted master brake cylinder, and the body (casing) thereof is designated by the reference character MCB which master cylinder is adapted, for example, for mounting in operating position on the vehicle firewall 8 in the engine compartment by means of a plurality of bolts 9 projecting through a like-number of holes 10 in lateral flanges 11, 12 integrally defining the rear open end of said body, said flanges having a smooth outer face 13 contiguous to the forward mating end of an interposed adapter member 14 with the rear end thereof juxtaposed with respect to the firewall 8 as shown in FIGURE 1, said adapter member having in spaced relation a pair of vertical end segments (legs) 15, 16 joined, as by welding, by an interconnecting arch-shaped segment 17 best shown in FIGURES 1, 2 and 3. These legs are provided with aligned holes 18, 19 which are spanned by elongated sleeves 21, and through which said bolts pass with the threaded ends thereof projecting through matching holes in the vehicle firewall 8 and lateral flanges 22, 23 defining the forward end of a pedal-support bracket BR in U-shaped cross section, whereby nuts 24 are effective to rigidly mount the master brake cylinder and pedal-support bracket on opposite sides, respectively, of the firewall 8 as shown in FIGURE 1. The elongated sleeves contribute to rigid horizontal mounting of the master brake cylinder by preventing axial deflection of the unit when under heavy pedal-actuation as would be the case in the event of hydraulic failure requiring operation of the master brake cylinder solely by operator force applied to a pedal P, disclosed herein as the suspended-type, and which is pivotally mounted at its upper end on a cross-shaft 25 supported at opposite ends in aligned holes 26 through the side walls 27 of the support bracket BR, said cross-shaft being adapted to carry a compressed torsion-spring 28 adjacent one side of the pivoted end of said pedal, with opposite ends 29, 30 of said spring connected to react on the adjacent bracket side wall and pedal arm 31, respectively. This spring assists in retracting the pedal P and push-rod 32 pivotally connected at 33 to an intermediate portion of the pedal arm, to their respective fully released positions wherein the vehicle brakes are released as shown by dashed lines in FIGURE 1 and by solid lines in FIGURE 4. An arrow-shaped cutout 34 is provided in the lower medial portions of the adapter legs, best shown in FIGURE 3, for clearance to enable mounting a generally cylindrical valve housing VH on the rear end of said master cylinder body MCB.

The lower portion of the master cylinder body MCB comprises a cylindrical wall 35 which is processed with a forward longitudinal bore 36 and a rear counterbore 37. The bore 36 is closed at its forward end by an integral wall 38 provided with a threaded discharge port 39, and opens at its rear end 41 into said counterbore in coaxial relationship therewith. The said longitudinal bore constitutes in part a variable working chamber 42 for the master cylinder MC, and the counterbore provides an actuator cylinder AC for said master cylinder. Reciprocably disposed in said cylinders is a pair of complemental actuator pistons 43, 44, respectively, and which are integrally formed in longitudinally spaced relation on a piston-carrying member generally designated PM, the piston 44 being herein disclosed in a broader patent sense as a "pressure-responsive wall."

The discharge port 39 is provided with a commercial hydraulic fitting 45 connected to the wheel cylinders (not shown) by means of a conduit (line) 46. The inner side of said end wall is engaged by an annular resilient valve seat 47 against which the annularly flanged portion 48 of a commercial residual pressure valve RV releasably engages to trap fluid in the brake system (lines and wheel cylinders) under a predetermined minimal pressure when the brakes are released to prevent cavitation, and to enable fluid from said pressure working chamber 42 to be displaced under pressure into the brake lines and connected wheel cylinders to apply the vehicles brakes as is understood. The fluid discharge function of the residual valve is carried out by a spring loaded one-way check valve CK embodied in the residual valve casing as shown in FIGURE 4.

The piston 43 in the master cylinder MC reciprocates in the bore 36 and is normally spaced from the end wall 38 to produce the aforesaid variable pressure working chamber 42 therebetween. This piston is equipped with a commercial lip-type cup seal 49 having a bonded valve washer 51 for controlling a plurality of circumferentially spaced ports 52 through the peripheral marginal portion of said piston and in confronting relationship to said valve washer, said ports communicating with a variable inner annular static chamber 53 defined by the space between said pistons 43, 44 and the inner side of an annular partition member disclosed herein as a flexible roll-type diaphragm 54 formed with a cylindrical wall having an annular metal-backed bead 55 defining its open end which engages a complemental groove 56 indented in the inner face of the forward end 57 of the actuator cylinder AC, and the opposite end of said diaphragm being closed by a "roll" inducing a radially looped end wall 58 formed with a central beaded aperture 59 which engages an annular groove 61 in the piston-carrying member PM adjacent the forward face of the actuator piston 44 as shown in FIGURE 4. The space defined by the outer side of said diaphragm and that portion normally between the actuator piston 44 and forward end 57 of the actuator cylinder, produce a variable outer annular static chamber 62, the latter chamber having continuous fluid communication with an intake passage 63 through an offset portion 64 in the aforesaid cylindrical wall 35.

A normally compressed spring 65 is operatively disposed in said working chamber 42 to react between said residual valve flange and a spring seat 66 contiguous to the bottom of said cup seal to maintain the latter against said piston 43 and to continuously urge the latter and piston-carrying member PM toward normal disposition as shown in FIGURE 4, and also to control operation of said residual valve RV to establish the aforesaid minimal line pressure external to the working chamber 42.

The aforesaid valve washer 51 is effective to close said ports 52 when the brake-fluid in said working chamber 42 is being pressurized, but during retraction of the piston 43, the valve washer accommodates movement of the brake-fluid through said ports from the inner static chamber 53 to maintain said working chamber filled thereby preventing cavitation with resultant initial idle movement of the master cylinder piston and corresponding loss of pedal travel in a brake-applying direction.

The upper portion of the master cylinder body MCB comprises a fluid supply reservoir R having a removable filler cap FC, and which is adapted for gravitational feed into the bores 36, 37. An integral transverse partition wall 67 divides the interior of the reservoir into front and rear compartments 68, 69, respectively. The cylindrical wall 35 between the front compartment and bore 36 is provided with a compensating port 71 which normally lies slightly ahead of the forward edge of the cup seal lip, the latter being adapted to close this port upon initial movement of the piston-carrying member PM in a brake-fluid pressurizing direction. A fluid intake passage 72 spaced from said compensating port is also provided through said cylindrical wall, to interconnect said front compartment with the aforesaid inner static chamber 53, said latter passage being processed at an angle through said wall to communicate with a surface groove 73 indented in the bore 36 adjacent the rear open end thereof. The aforesaid intake passage 63 is in continuous communication with the rear compartment 69 thereby interconnecting the latter with the outer static chamber 62.

It is thus seen that the partition diaphragm 54, which is preferably made of molded rubber, serves to provide a pair of inner and outer static chambers on opposite sides, respectively, of the cylindrical wall thereof, and which have continuous communication with the front and rear compartments 68, 69 via the intake passages 72 and 63, respectively, and which compartments in the embodiment of the invention being described contain brake-fluid and lubricating oil, respectively, the latter having the dual purpose of lubricating the engine working parts and actuating in part the actuator piston 44 to provide hydraulic-assist for the vehicle brakes.

The aforesaid filler cap FC is characterized by novel features of construction and operation and comprises an exterior annular flange 74, a reduced diameter externally threaded body portion 75, a coaxial exterior embossment 76 preferably of hexagonal profile for reception of a wrench for manual removal and installation of the cap from an internally threaded opening 77 provided through a circular embossment on the central exterior of the upper wall of the reservoir as shown, a threaded circular socket 78 is coaxially provided in the body portion 75 and which receives an externally threaded plug 79 having an axial bore 81, said axial bore is coaxial with a breather passage (vent) 82 which passes through said flange 74 and embossment 76 to the exterior of said cap. The inner end portion of said passage terminates in a circularly flared valve seat 83, and the axial bore in said plug terminates at its upper end into a concavity 84 spaced from said valve seat to produce therewith a valve chamber 85 in which a movable check-valve element (ball) 86 is positioned to cooperate with said valve seat 83 to prevent escape of actuating oil from the rear compartment 69 should a slightly pressurized condition develop accompanied by surging of the oil which, if present, would cause the ball to move upwardly and seat tightly thus closing the breather passage 82. When the actuating oil in the rear compartment is under normal non-activating flow movement, the ball drops under gravitational influence to vent the rear compartment to atmosphere thus avoiding any tendency of oil surge therein when the actuator piston 44 is in normal position (brakes off) to create a pressurized condition, or a vacuum condition so that the oil in the rear compartment 69 may freely circulate under influence of the source of pressurized oil as will appear.

Accordingly, if the rear compartment 69 should become filled to overflow causing slight pressurization thereof, the check-valve ball 86 is effective to restrict oil surge and pressure to the interior of said reservoir compartment and thereby avoiding oil loss via the breather passage 82; but under normal flow conditions, the check-valve ball 86 would occupy its lowermost position in said concavity 84 to open the breather passage 82 to the atmosphere as well as to the rear compartment 69.

The axial bore 81 through the plug 79 opens at its lower end into a hex-socket 87 for use of a complemental wrench to insert and tighten said plug in the socket 78 as shown. A central circular recess 88 provided in the body portion 75 defines the lower end of said socket, and which receives a complemental disc 89 preferably made of plastic or rubber, and having a central aperture 91 communicating with said hex-socket. The upper end portion of the partition wall 67 is formed with a shelf 92 normal thereto, the upper side of the latter is flush with the underside of said body portion 75 whereby when said filler cap FC is installed, the aforesaid resilient disc is impinged between said shelf and bottom of the aforesaid recess 88 to provide an oiltight seal therebetween to isolate the upper portions of the reservoir compartments. An angular passageway 93 is provided in said shelf to maintain communication between said rear compartment 69 and the axial bore 81 thus completing the oil connection between the rear compartment and the check-valve ball 86.

Radially offset from the axis of the aforesaid socket 78, is a blind bore 94 processed parallelly thereto in said body portion 75, and which communicates at its upper end with a vent passage 95 to the atmosphere, to provide an atmospheric vent for the front brake-fluid compartment 68 as is understood.

A circular opening 96 is provided through said partition wall 67 adjacent the lower side of said partition shelf, and which is fitted with an annular rubber grommet 97 as shown. A return oil flow pipe 98 spans the length of the front compartment 68 and projects at its rear end through said grommet in oil-tight sealing relation thereto to communicate with said rear oil supply compartment 69. The opposite forward threaded end engages a threaded hole 99 which passes through an embossment 101 formed integrally with the upper portion of the end wall 102 of said front compartment 68. The threaded end has a terminal hex-flange 103 which tightly engages a sealing washer against the face of said embossment to stabilize the pipe in the position shown. The hex-flange is internally threaded to receive the threaded portion of a commercial hydraulic fitting 104 which connects a return flow conduit 105 to said pipe.

The piston 44 which reciprocates in the actuator cylinder AC defines with the right end 106 of said cylinder, an annular variable pressure control chamber 107. An elongated cylindrical outer valve member 108 constitutes the rear terminating portion of the piston-carrying member PM. This valve member projects from an annular offset porton 109 integral with said piston 44, through a bore 111 in said valve housing VH and coextensive therewith in coaxial relationship with respect to said bores 36, 37 best shown in FIGURE 4.

The aforesaid valve housing VH is provided with a triangular outstanding mounting flange 112 spaced from the forward end of a cylindrical wall portion 113 which projects into the open end of the actuator cylinder AC to close the same and thereby defining the right end 106 of said cylinder. A medially disposed elongated embossment 114 is integrally formed on the upper side of said valve housing and substantially coextensive with the rear end portion of the cylindrical wall 113 as shown. The outer end portion of the cylindrical wall terminates in a hub 115 provided with an external annular groove 116 which receives the annular beaded forward end 117 of a flexible dust boot B. The aforesaid annular offset portion 109 on the right side of the actuator piston 44, is adapted to engage the confronting end of the forward end portion of the valve housing to provide stop means for the piston-carrying member PM and thereby defining the normal fully retracted position of said member as shown in FIGURE 4.

As best shown in FIGURE 3, the valve housing VH is disposed within the aforesaid arrow-shaped cutouts 34 in the adapter legs 15, 16. Three cap screws 122 are adapted to attach the mounting flange 112 to that portion of the rear face 13 on the master cylinder body MCB in coaxial relationship to the bores 36, 37 as shown. A gasket 122a overlies the face 13 and is impinged by the flange 112 and confronting portion of leg 115 to seal the valve housing VH to the face 13. The embossment 114 is provided with a horizontal oil passage 123 having its forward end in communication with a port 124 through the rear end wall 125 of the rear oil compartment 69, and its rear open end communicates with a vertical oil passage 126, and the upper end of the latter passage is closed by a removable plug 127, and the lower end thereof opens into an internal annular channel 128 processed in the bore 111 as shown. An outer valve chamber 129 is also provided in said bore 111 in forwardly spaced relationship to said channel 128, and a pair of internal annular grooves 131, 132 in said bore adjacent opposite ends of said valve housing carry complemental annular packings (O-rings) 133, 134, respectively, through which said outer valve member 108 reciprocably projects in oiltight sealed relationship. A threaded opening 135 is provided through a portion of the underside of said valve housing wall 113 to continuously communicate with said annular valve chamber 129.

The aforesaid piston-carrying member PM includes in addition to said pair of pistons 43, 44, an elongated blind axial bore 136, the inner end of which terminates in a reduced diameter recess 137 to provide a seat for one end of a normally compressed valve return and reaction spring 138 with the other end of said spring reacting on a recessed confronting end 139 on an inner valve control member (piston) 141 slidably disposed in said axial bore 136. The outer end of said axial bore 136 terminates in a counterbore 142 in which the flanged outer end 143 of the valve control member is reciprocably disposed. An annular shoulder 144 defines the juncture of the axial bore 136 and counterbore 142 to serve as an abutment face for the confronting end of said flanged end 143 when the relative operative movement of said valve members is fully taken up wherein power-run-out of the actuator cylinder AC is effective, thus enabling operator-actuation of said master cylinder MC in the event of partial or complete failure of said source of pressurized oil for said actuator piston 44 to assist operator control of said master cylinder MC. The aforesaid flanged end 143 is provided with a cross-bore 145 which merges with an outwardly flared cutout 146 for reception of the ball-end 147 of said push-rod 32 to complete the mechanical connection between the valve control member 141 and pedal arm 31 as shown in FIGURE 1 whereby pedal movement is transmitted to said valve control piston 141 to control said actuator piston 44 in follow-up sequence as is understood. Adjacent the outer end of said counterbore 142 is an internal annular groove 148 fitted with a split-type stop ring 149 to limit relative displacement of the valve control piston 141 with respect to the outer valve member 108 under influence of its return spring 138, thus defining the normal relative positions of said valve members 108, 141.

A normally compressed spring 151 is operatively disposed in the aforesaid outer static chamber 62 to react between the aforesaid annularly flanged bead 55 defining the forward open end of said partition diaphragm 54 and an annular shoulder 152 provided on the forward face of the actuator piston 44, to urge the latter toward normal position shown in FIGURE 4. The diaphragm bead 55 therefore is impinged in oiltight sealing relation with its cooperating annular groove 56 processed in the face of the closed end 57 of the actuator cylinder AC, said bores 36, 37 merging to produce said face on the closed end of said cylinder. Thus, said spring serves to stabilize the open end of said diaphragm 54 in effective sealing relationship and also acts as a means for returning the piston 44 and connected piston-carrying member PM to their respective normal positions wherein said offset portion 109 on the piston 44 is in abutting relationship with the forward end 106 of the valve housing VH.

The space obtaining between the aforesaid bore recess 137 and confronting end 139 on the valve control piston 141, produces a pressure reaction chamber 153 which continuously communicates with said control chamber 107 to the right of said actuator piston 44 via an angular passage 154 formed in said piston.

The aforesaid valve control piston 141 is provided with a pair of spaced working lands 155, 156 and spaced from the land 155 is a fluid-retaining land 157. The space between said working lands produces with a reduced diameter interconnecting portion 158, an annular inner valve chamber 159, and the space obtaining between the land 155 and fluid-retaining land produces with a reduced diameter interconnecting portion 161 an annular return flow chamber 162 which selectively communicates with a pair of diametrically-opposed control passages 163 through the wall of the piston-carrying member in circular alignment with the aforesaid offset portion 109 as shown in FIGURE 4, said pair of passages opening at their outer ends into said control chamber 107. Another angular passage 164 is provided in the piston 44 and which interconnects the return flow chamber 162 with the outer static chamber 62 in the actuator cylinder AC whereby release of the valve control piston 141 enables the working land 155 to open said pair of passages 163 by its disposition to the right of the latter as shown, which places the control chamber 107 in communication with the return flow chamber 162 from which oil flows through the angular passage 164 into the outer static chamber 62 thence through the passage 63 into the rear oil compartment 69 and return flow pipe 98 and conduit 105 into the oil sump OS for re-circulation by the source of pressurized oil as will appear.

Spaced rearwardly of the control passages 163, are two pairs of diametrically-opposed spaced interconnecting and control passages 165, 166, respectively, through the wall of the outer valve member 108, said pair of passages 165 being in continuous communication with the aforesaid outer valve chamber 129 and with the aforesaid inner valve chamber 159, the latter chamber communicating with the exterior of said valve housing VH via the aforesaid threaded opening 135, which is fitted with a commercial hydraulic fitting 167, connects to the upper end of an upstream pressure flow conduit 168 (see FIGURE 1).

The left end face of the working land 156 is adapted to cooperate with said control passages 166 to selectively close and open the same in synchronism with similar control of the passages 163, the former passages being normally open as shown. The working land 155 is adapted to selectively control the radial control passages 163 for connection to the return flow chamber 162 and the inner valve chamber 159 to control ingress and egress, respectively, of pressurized oil into and out of control chamber 107 whereby operator pedal movement is transmitted to the actuator piston 44 to produce the well known follow-up sequence as a function of the relative interaction of said valve members 108, 141 comprising control valve means CV for controlling movement of the actuator piston 44 to effect corresponding movements of the master cylinder piston 43 to apply and release the vehicle brakes (not shown).

The aforesaid pedal push-rod 32 is provided with an external annular groove 171 spaced from the connected ball-end, for reception of an annular bead 172 forming the outer central open end of said dust boot B, whereby the flexible nature of the boot and the flared cutout in the flanged end of the valve control piston 141, accommodate vertical rocking of the push-rod to compensate for the arcuate sweep of the pivotally connected end of said push-rod to the pedal P caused by the swinging movement of the pedal from its upper pivotal end on the aforesaid bracket BR.

The peripheral surface of the actuator piston 44 is provided with a pair of spaced annular grooves 173, 174, with the latter groove having a portion of its outer flange 175 removed to expose the annular lip portion 176 of an annular pressure seal 177 carried in the groove 174. A split-type metallic piston ring 178 is carried by the groove 173, whereby said piston ring and seal are effective to seal the peripheral portion of the piston 44 oil-tight with respect to the counterbore 37 (actuator cylinder AC), particularly when the control chamber 107 is under pressurized actuating oil.

As shown in FIGURE 1, a source of pressurized oil is provided by an engine-driven oil pump OP, said pump comprising a pair of intermeshing gears 181, 182, the latter gear being keyed to a drive shaft 183 which in turn is suitably driven from a rotating part of the engine, such as the camshaft (not shown), said gears being rotatable in a pump housing 184 provided with an intake chamber 185 and a pressure output chamber 186, the output chamber communicating with the engine oil gallery 187 and a minimal pressure lubrication valve LV and a maximum pressure relief valve PRV. The lubrication valve LV is provided with a ball-type check valve element 188 biased into seating relation with its co-operating seat 189 by means of a normally compressed spring 191 calibrated to produce the required minimal lubrication pressure of 7–10 p.s.i., and the outer end of this valve is connected to the lower end of the aforesaid upstream pressure flow conduit (line) 168 by means of a commercial hydraulic fitting 192. The pressure relief valve PRV is also provided with a ball-type check-valve element 193 adapted to engage its cooperating seat 194 under influence of a normally compressed spring 195 calibrated to produce the required maximum pressure output of said pump OP of approximately 55–60 p.s.i. for lubricating and brake actuating purposes. A commercial hydraulic T-fitting 196 is connected by means of a commercial hex-bushing 197 to one end of a return flow conduit 198 having its other end connected to the outer end of said pressure relief valve PRV by means of a commercial hex-bushing 199. The pump intake chamber 185 is connected to said T-fitting by means of an intake conduit 201 connected at opposite ends by means of commercial hex-bushings 202, 203, respectively, and the lower end of said T-fitting is connected by a hex-bushing 204 to a conduit 205 as a continuation of the intake conduit 201, the latter opening into the aforesaid oil sump OS whereby the pump OP is capable of drawing oil from the oil sump through conduits 205, 201 into the intake chamber 185 and discharging the same under pressure through the output chamber 186 and pressure flow conduit 168 into the outer valve chamber 129 for selective distribution to the radial control passages 163 to control actuation of said actuator piston 44 and to the con-passages 166 are closed by the working land 156, actuator piston, said passages 163, 166 being controlled by the spaced working lands 155, 156, respectively, as shown in FIGURES 4 and 5, the latter figure showing the actuator piston 44 moving to apply the vehicle brakes by unitary axial movement of the master cylinder piston 43 to pressurize the brake-fluid.

The minimal lubrication valve maintains the upstream conduit 168 and connected valvular passages and chambers aforesaid filled which overflow through passages 126, 123 and port 124 into the rear oil compartment 69 with the overflow from the latter being conducted through return flow pipe 98, conduit 105 back to the oil sump OS for re-circulation by the oil pump OP.

Initial movement of the pedal P moves the valve control piston 141 against its return and reaction spring 138 to the relative position shown in FIGURE 5 wherein said passages 166 are closed by the working land 156, and the radial control passages 163 are opened by the working land 155 being disposed to their left, place pressurized oil effective in the inner valve chamber 159 in communication with the control chamber 107 in the actuator cylinder AC to move the actuator piston 44 to the left from position shown in FIGURE 4, however, if pedal movement is halted at any operating position thereof from normal position shown in FIGURE 4, the actuator piston 44 will move slightly farther to the left as viewed in FIGURE 5 (see dashed line position) to "lap" the radial control passages 163 to produce what is termed in the industry a "holding" position of the control valve means CV wherein movement of the actuator piston 44 ceases under counter-balancing forces, and thereby holds the vehicle brakes "on" until pedal movement is resumed in either a depressing or releasing direction as desired, to effect corresponding movement of the actuator piston 44 as is understood.

*Automatic clutch means for disconnecting the actuator piston and piston-carrying member*

Reference is now made to FIGURES 6, 7, 8, and 9 wherein I have disclosed a modified form of the invention particularly relating to the actuator piston 44 and piston-carrying member PM and providing automatic means for disconnecting these two components so that the piston-carrying member and piston 43 may be operated independently of the actuator piston 44 to apply and release the vehicle brakes in the event of hydraulic failure.

The automatic means comprise a fluid-pressure and spring operated positive clutch generally designated PC operably incorporated between the actuator piston 44 and piston-carrying member PM to lock these two components to move as a unit in both directions when the actuating oil is effective in the control chamber 107. When such actuating oil is ineffective, the clutch PC is operable to disconnect these two components automatically for independent movement of the piston-carrying member under sole influence of operator-actuation of the pedal P so that the frictional drag of the actuator piston and opposing reaction from the return spring 151 including working the oil into and out of the control chamber 107 and outer static chamber 62, are negated by enabling the actuator piston to return to its normal position shown in FIGURE 6 out of interference with the independent movement of the piston-carrying member PM to apply and release the vehicle brakes solely by operator force applied to the pedal P, therefore, this modification reverts the hydraulic assist master cylinder MBC to a foot-operated unit in the event of hydraulic actuating pressure failure.

This novel clutch PC additionally includes hub-like extensions 211, 212 projecting from opposite sides, respectively, of the central portion of said actuator piston 44 and defining an axial bore 213 coextensive with said hub extensions and through which the normal diameter of the piston-carrying member slidably projects. The end of the hub extension 211 normally engages an annular outstanding shoulder 214 formed on said piston-carrying member to enable said actuator piston 44 to move the same in a brake-fluid pressurizing direction. A pair of diametrically opposed passages 215 maintains oil communication between the outer static chamber 62 and the return flow chamber 162. An annular oil chamber 216 is indented in the bore of the hub-like extensions, and in equally spaced arrangement are three circular embossments 217 projecting inwardly from the bottom of said chamber 216 so that their inner ends mate with the outer cylindrical surface of the piston-carrying member PM as shown in FIGURE 6. An angular passage 218 is processed through the hub extension 212 to interconnect the control chamber 107 and the oil chamber 216 in the hub-like extensions, and the pair of control passages 163 through the wall of the member PM interconnects said oil chamber 216 and the return flow chamber 162 when the valve control piston 141 is in normal position as shown in FIGURE 6.

The intake passage 72 interconnects the front reservoir compartment 68 with the inner static chamber 53, and the horizontal passage 123 processed in the valve housing embossment 114, communicates at its forward end with a port 219 in an oil transfer member 221 having a vertical channel 222 closed at opposite ends and which communicates with an opening 223 in the adapter leg 15 which in turn registers with the aforesaid port 124 through the rear wall 125 of the rear compartment 69 whereby the latter is continuously connected to the horizontal passage 123. The transfer member 221 is impinged between the confronting face on the adapter leg 15 and a flat cross shoulder 224, and a confronting portion of the extremity of the adapter leg 15 is impinged between a shoulder 225 in forwardly stepped relation to said shoulder 224, to provide an oiltight seal between said adapter leg, transfer member 221 and forward end of the embossment 114 as shown in FIGURE 6.

The cup seal 49 is modified to have a central aperture 226 through its bottom wall, and a pressfitted bushing 227 closes the open end 228 of the reaction pressure chamber 153. This bushing is formed at its forward end with an outstanding annular flange 229 spaced from the confronting end of the piston 43 to produce an annular external channel 231 for reception of the marginal portion of said cup seal aperture 226 to stabilize the cup seal against the face of the piston 43 as shown. The bushing and spring seat 66 are centrally apertured with coextensive axial bores 232, 233, respectively, and a seat for one end of the spring 138 is provided in abutting relationship to the rear end of said bushing, and which is also provided with a central aperture in alignment with the axial bores aforesaid whereby the pressure working chamber 42 and reaction pressure chamber 153 are maintained in communication to provide a diminutive hydraulic reactive pressure against the fluid-retaining land 157 for operator awareness of the amount of braking force in effect at any given position of the pedal P.

An annular clutch actuating cylinder CC is provided in the right side of the piston 44 confronting the control chamber 107, and a complemental piston 235 is reciprocably disposed in said cylinder and is normally in fully retracted position as shown in FIGURE 6 when the actuator piston 44 is released to its normal position wherein the vehicle brakes are "off" and the clutch CC disengaged. This annular piston is provided with three equally spaced plungers 236 which reciprocably project through horizontal bores 237 radially spaced parallelly to the piston axis and which are processed through the closed end 238 of said cylinder to the left exterior of said actuator piston 44, and the right ends of said plungers terminate in a reduced diameter portion to produce annular shoulders, as shown, which abut the left face of the piston 235 when the reduced diameter portions are pressfitted, or otherwise secured in complemental holes through said piston for unitary reciprocable movement of said piston and plungers. An annular groove 239 is provided adjacent the forward (left) ends of each of said plungers which are fitted with split-type retaining rings 241 to serve as stop means when engaging the forward (left) side of said actuator piston to limit the retractile relative movement of said piston 235 under influence of a plurality of normally compressed springs 242 in blind bores 243 formed in the piston 44 in circumferentially staggered relationship with respect to said plungers, to react between the blind ends of said bores, respectively, and spring recesses formed in the confronting face of the annular piston 235 best shown in FIGURES 6 and 7. The blind ends of said bores 243 are provided with central apertures 244 to interconnect the forward (left) side of said annular piston and the outer static chamber 62 to negate compressive conditions on the oil between the closed end of the cylinder CC and annular piston 235, which if present would impede free movement of the piston in said cylinder. In radial alignment with said plunger bores, a corresponding number of radially intersecting bores 245 are processed in said actuator piston and which interconnect the periphery of the latter with the oil chamber 216 in said hub-like extensions aforesaid. Each of said plungers is provided with a transverse notch 246 in its radially inward side, and reciprocably disposed in said radial bores 245 are a like-number of inwardly projecting interlocking elements (pins) 247 for selective engagement with said notches and an annular channel 248 provided in said piston-carrying member PM, said channel being formed with an angular camming ramp 249 defining one side of said channel, said interlocking pins being radially actuatable into and out of said channel 248 by the camming action of the notches and camming ramp 249, respectively. Opposite ends of said pins being dome-shaped to facilitate cooperative camming action by said notches and ramp as is understood. Therefore, movement of the piston 235 from the position of FIGURE 6 to the position of FIGURE 8 is effective to actuate the plungers to the position shown under pressure conditions in said control chamber 107, to force the interlocking pins 247 radially inwardly into the channel 248 to lock said actuator piston 44 to the piston-carrying member PM to move as a unit in both directions since the end of the hub 211 is in abutting relationship with respect to the shoulder 214 on said member PM. It is important to note at this point that the piston 235 must be actuated to effect locking of the actuator piston 44 to the piston-carrying member prior to the pressure in the control chamber 107 being effective to move said actuator piston. Resistance to initial movement of the actuator piston 44 is provided by reaction from piston return spring 151 supplemented by reaction from spring 65, and the plunger return springs 242 must be installed to have less thrust-transmitting capacity than the combined pre-compression of springs 151, 65.

In the event that actuating pressure should not be present in the control chamber 107 due to malfunctioning of the source of pressurized oil (pump), or fracture of a hydraulic line, the interlock actuating piston 235 would move to its normal position with respect the actuator piston 44 as shown in FIGURE 9, to release the interlocking pins 247 for outward radial movement into the notches in the plungers upon the piston-carrying member being moved under operator-actuation and thereby disconnecting the piston-carrying member PM from the actuator piston 44 so that operator-actuation of said member can be effected free of frictional drag and opposition from the piston return spring 151 thus providing in effect conventional pedal-operation of the master cylinder piston 43. Whereas, in the case of hydraulic failure, should the actuator piston 44 be connected to the piston-carrying member PM to move as a unit therewith as disclosed in the main embodiment of FIGURES 1 and 4, the operator would have to work the oil to and from the control chamber 107 and static chambers 53, 62 which would produce a dash-pot action with considerable resistance to movement of the actuator piston 44 when ineffective to assist pedal-operation of the master cylinder piston 43 as is understood.

Accordingly, the aforesaid novel interlocking arrangement for the actuator piston and piston-carrying member provides for automatic disconnection of these two components when hydraulic pressure fails so that the piston-carrying member and piston 43 can be operated independently of the actuator piston in a fluid-pressurizing direction directly by the pedal P and connected push-rod 32 upon the valve flange 143 engaging the shoulder 144 on the outer valve member 108 and whereat all of the relatively operating movement between the valve members 108, 141 is fully taken up.

It will be noted by referring to FIGURE 9, that irrespective of the actuating position of the actuator piston 44 along its full operating stroke within the actuator cylinder AC, that when actuating pressure in the control chamber 107 falls below the combined reactive forces of the clutch return springs 242, the latter retract the plungers 236 to normal positions shown in FIGURES 6 and 9 which releases the interlocking pins 247 for radial movement outwardly into the notches 246 to disengage from the channel 248 and thereby releasing the piston-carrying member PM from the actuator piston thus enabling the latter to return to non-interfering normal position under influence of its return spring 151, so that actuation of the member PM may be effected solely by operator force applied to the pedal P.

It is thus seen that the actuating pressure in control chamber 107 must exceed the combined reactive forces of the springs 242 to effect engagement of the clutch PC, and that such clutch actuating pressure must be less than required to initially move the actuator piston 44 so that the latter and piston-carrying member PM are locked together as a unit prior to actuating movement of the actuator piston to effect a brake-applying operation and release thereof.

*Operational summary*

The operation of my improved master brake cylinder MBC should be apparent from the foregoing description considered with the drawing but may be summarized for further clarifications as follows:

Assuming that the master cylinder MBC is installed on a motor vehicle as the present disclosure exemplarily demonstrates in FIGURE 1, to operate the hydraulic brake system commonly used on such vehicles, is in released "brake off" condition as depicted in this figure. With the engine running at idling speed and the gear pump OP, for example, being driven thereby to draw oil from the oil sump OS through intake conduits 201, 205, oil in the pressure output line 168, outer valve chamber 129, inner valve chamber 159, vertical and horizontal passages 126, 123, respectively, port 124 and rear oil compartment 69, is in a static non-activating condition due to the lubrication valve LV directing pressure flow from the pump into the oil gallery 187 as a function of the calibration of reaction spring 191 against the ball check element 188 to maintain the latter on its seat 189. This spring is calibrated, for example, to require a pressure of 7–10 p.s.i. to unseat the ball check element 188 for pressure flow into the pressure output line 168, thus providing adequate lubrication for the engine working parts under low speed operation of the engine before any oil can be diverted for actuation of the master cylinder actuator piston 44 for brake assist operations. Under these circumstances, the oil level in the rear oil compartment 69 is below the opening through the return flow pipe 98 thus this pipe and connected conduit 105 are empty.

However, upon increase of engine speed with resultant increase in pressure flow output by said pump OP, the lubrication valve element 188 is forced off its seat accommodated by yielding of the spring 191, so that such increased pressure flow enters the output conduit 168 thus reaching the rear oil compartment 69 to raise the oil level therein to overflow through the return pipe 98 and return conduit 105 back into the oil sump OS for recirculation by the pump OP as is understood. Thus, it is seen that when the engine is idling, pressure flow is blocked from the pressure output line 168 by the seated condition of the lubrication control valve LV and therefore, the return flow pipe and conduit 98, 105, respectively, are empty; but upon increasing engine speed with corresponding increase in pressure flow from the oil pump OP, the lubrication valve LV opens to enable such increased pressure flow to enter the output pressure conduit 168 for circulation through the rear oil compartment 69 back into the oil sump until the control valve means CV are operated to direct a portion of such actuating pressure into the control chamber 107 to actuate the actuator piston 44 and master cylinder piston 43 to apply and release the vehicle brakes as is understood.

Upon actuation of the valve control piston 141 of the control valve means CV, relative to the outer valve member 108, under operator force applied to pedal P, the valve working land 156 is positioned to block channel 128 communicating with the vertical passage 126, and the pressurized oil induced thereby in the inner valve chamber 159 is controllable by the valve working land 155 to communicate with the control passages 163 and connected control chamber 107 to actuate the actuator piston 44 from the FIGURE 4 position to the FIGURE 5 position, to effect corresponding actuation of the connected master cylinder piston 43 to pressurize the brake-fluid in the working chamber 42 and displace the same through the check-valve CK of the residual pressure valve RV into the brake line 46 to actuate the connected wheel cylinders (not shown) to apply and release the vehicle brakes as required in accordance with pedal movement under control of the operator.

The FIGURE 4 main embodiment utilizes two return springs 65, 151 for the piston-carrying member PM, however, spring 151 may be eliminated since spring 65 is capable of effecting this return operation. If this spring is eliminated from the structure then there must be provided suitable means for maintaining the annular bead 55 defining the open end of the partition diaphragm 54 in oil-tight sealed relationship with its cooperating groove 56 as is understood.

In the FIGURE 6 modification both springs 65, 151 are essential to its operativeness, since spring 151 has an independent function of returning the actuator piston 44 to normal position when the clutch PC automatically effects disengagement of this piston from the piston-carrying member PM upon actuating pressure in the control chamber 107 becoming inoperative. It should be importantly observed in connection with the relative operational behavior of springs 65, 151 that their combined reactive force or the reactive force of spring 151 alone must be greater than the clutch return springs 242 in the clutch PC, to enable relative movement of the clutch piston 235 to actuate the connected plungers 236 to interlocking condition of the actuator piston 44 so that the latter can be effective in its reciprocating movements to control operation of the vehicle brakes as an assist to manual operation of the latter.

It is further important to note that during the aforedescribed brake-applying operation, the pedal P may be halted at will as required to effect "holding" the brakes "on," such holding operation being effected by the outer valve member 108 advancing slightly relatively to the inner valve member 141 in a brake-fluid pressurizing direction under influence in part of the actuator piston 44, to "lap" the valve working land 155 and control passages 163 (see dashed line positions of piston-carrying member PM and included control passages 163 in FIGURE 5), thus establishing the actuator piston 44 to "hold" the brakes in their existent applied condition as a function of trapping the oil in control chamber 107 by overlapping of the control passages 163 on the working land 155 which establishes counterbalancing forces on opposite sides of the piston 44, until the operator either depresses or releases the pedal P.

The outer and inner valve members 108, 141 are related in close tolerance to produce exactness in their relative followup action as a function of their unitary movement with the piston-carrying member and pedal P, respectively, so that minimal pedal movement "inches" the master cylinder piston 43 into applying or releasing pressure on the brake-fluid to produce a sensitized and predictable operator control over the effective braking force, and thereby avoiding "grabbing" and resultant possible discomfort to occupants of the vehicle caused by "lurching" of the latter.

During a brake-applying operation by the actuator piston in part, it is important that the driver has an awareness (physical perception) of the amount of braking force in effect at any given position of the pedal P. Novel means are provided by the aforesaid reaction chamber 153 which continuously communicates with the control chamber 107 via angular passage 154 or optionally with the working chamber 42 (see FIGURE 6) whereby a diminutive pressure reaction is continuously effective against the confronting end of the fluid-retaining land 157 on the valve piston 141, such diminished hydraulic reaction being supplemented by the continuous reaction from the valve return spring 138, the latter providing resistance to initial pedal movement to prevent erratic initial control of the actuator piston 44 at the point of inaugurating its assistance to apply the vehicle brakes. Upon this spring yielding, the hydraulic pressure from the oil pump OP becomes effective in the control chamber 107 to produce the desired follow-up power-assist.

When taking the brakes "off," by retracting the pedal P toward its normal position shown in FIGURES 1 and 4, it should be importantly noted that pressurized oil in the control chamber 107 is relieved by the radial control passages 163 being placed in communication with the return flow chamber 162 by positioning the left side of the valve working land 155 to the right of said passages as shown in FIGURE 4, and the angular passage 164 conveys such relieved pressure flow into the outer static chamber 62 with the latter chamber being continuously connected to the rear oil compartment 69 via the passage 63. Normalizing of the brake-fluid in the master cylinder working chamber 42 is effected by opening of the compensating port 71 which is closed by the master cylinder piston 43 during all pressurizing stages of the latter. Also the inflow of brake-fluid into said working chamber 42 during retraction of the piston 43 is provided by the ports 52 and over the annular lip of the cup seal 49, while the inner static chamber 53 in the actuator cylinder AC is maintained filled by its interconnection with the front brake-fluid reservoir 68 via angular intake passage 72 and surface groove 73 as shown in FIGURE 4.

Accordingly, when taking the brakes "off" by retraction of the actuator piston 44 in response to release of the pedal P, the pressurized oil in the control chamber 107 is relieved by its selective connection to the return flow chamber 162, angular passage 164, outer static chamber 62 back into the rear oil compartment 69 for re-circulation by the pump OP as described above.

Assuming there is a failure of the pump OP to pressurize the oil, and the operator desires to apply the vehicle brakes notwithstanding hydraulic assistance is inoperative. In such case, the pedal P would be depressed in usual manner but requiring more effort on the part of the operator to protract the piston-carrying member PM via engagement of the valve flange 143 with the cooperating shoulder 144 carried by the inner and outer valve members 141, 108, respectively, engagement of said valve flange and shoulder defining full take-up of the relative operating movement of said valve members as is understood. Such unison movement of the parts aforesaid protracts the master cylinder piston 43 to pressurize the brake-fluid in its working chamber 42 to operate the vehicle brakes solely under pedal-actuation with an operating force substantially the same as any conventional foot-operated master cylinder would require.

Whereas, in prior art brake applications upon failure of the power-booster unit, or an assist therefor following power-run-out, was accomplished by transmitting operator effort through the movable power-actuator assembly of such units such as the actuator piston 44 of the present invention thus requiring more effort than normally required to operate conventional foot-operated master cylinders; the modified form of the present invention comprising the clutch cylinder CC as disclosed in FIGURE 6, enables the actuator piston 44 to return to its normal position out of engagement with the piston-carrying member PM in the event of hydraulic pressure failure so that pedal-actuation operation of the piston-carrying member and piston 43 can be effected with substantially the same operator input force as commercial master cylinders require. This novel feature is provided by the aforesaid novel fluid-pressure operated clutch PC which forms part of the actuator piston 44 as shown in FIGURE 6, thus providing the advantages of having hydraulic assist to reduce pedal effort, or automatic disengagement of the actuator piston 44 when hydraulic assist is ineffective for normal pedal effort as required to operate commercial foot-operated master cylinders.

The invention contemplates that the actuating fluid for the actuator cylinder AC may be the lubricating oil for the working parts of the engine, or the same fluid as used in the hydraulic braking system which in the latter case, the reservoir partition wall 67, return flow pipe 98, passage 63 and partition diaphragm 54 would be eliminated with the two static fluid chambers 53, 62 merging into a single static fluid chamber, and a single reservoir compartment serving both the master and actuator cylinders. The purpose of the diaphragm 54 is to keep the actuating oil separated from the brake-fluid when the latter is different from the former, and to accommodate axial movement of the actuator piston 44 through its full operating stroke whereby the "rolling-action" (deformation) of the diaphragm conforms to the expansion and contraction of the concentric static fluid chambers 53, 62.

The nature of the invention obviously discloses a hydraulic-assisted master brake cylinder MBC which is of simple and economical construction and readily assembled and disassembled, and operates with a high degree of efficiency and dependability in a wide range of applications, particularly as a booster control for vehicle brakes and steering systems wherein a degree of operator control is necessarily retained for reaction "feel" of the brake pressure or road reaction, respectively, to enhance the control as well as safeguard against possible power-assist failure, such advantages being provided with considerable reduction in operator effort over that normally required when such systems are operated solely by operator force.

The engine-driven oil pump OP and associated hydraulic circuit are conventional, however, the minimal lubrication valve LV interposed in the upstream conduit 168 is only required in installations of my master cylinder MBC which utilize for its operation pressurized lubricating oil. In installations where the actuating fluid for the actuator cylinder AC is supplied by a pump separate from the oil pump OP, and driven by the engine or from a rotating element associated with the driving mechanism of the motor vehicle, it is important to observe that the conventional oil pump arrangement is not disturbed, and the minimal lubrication pressure control is also eliminated from such separate fluid circuits controlled by the separate pump.

The installation of my novel master brake cylinder MC as embodied in the present disclosure, requires engine speed above idling speed to operate the oil pump OP to produce sufficient actuating pressure for the actuator cylinder AC to perform its assist function, and since the minimal vehicular speed in any of the driving ratios of the associated change-speed gearing (not shown) corresponds to engine speeds above idling speed, the oil pump OP would provide sufficient actuating pressure above that required for pressure lubrication of the engine parts, to actuate the actuator cylinder AC to assist in applying the vehicle brakes; but when the car is standing with the engine idling, the operator would apply the brakes under such conditions without hydraulic assistance from the actuator cylinder AC. In the case of the modified master brake cylinder shown in FIGURE 6, operator exertion would correspond substantially to that required for operation of any foot-operated master cylinder due to the automatic disconnection of the actuator piston 44 from the piston-carrying member PM. Upon engine speed increasing to get the vehicle underway, the oil pump OP would supply sufficient pressure flow for a portion thereof to be diverted via the lubrication control valve LV to the actuator cylinder AC, and thereby making power-assist effective to reduce pedal effort while the car is being driven.

However, hydraulic-assist may be provided notwithstanding the engine is idling and the vehicle stopped in the case where the oil pump OP produces the actuating pressure for the actuator cylinder AC, by the interposition of a commercial spring-loaded accumulator (not shown) in the upstream conduit 168 whereby pressurized oil supplied by the accumulator would effect several hydraulic-assisted brake-applying operations independently of oil pump operation.

The foregoing description considered with the drawing is believed to set forth the achieving of the objects stated above, and the advantages to be derived therefrom.

It is to be understood that I do not wish to limit my invention to the above described novel association of the disclosed elements and details, and that the invention includes such other modifications and substitutions readily apparent to persons skilled in the art to which the invention relates, as defined by the terms of the subjoined claims.

Having thus described my invention, I claim:

1. A hydraulic pressure-producing device in which physical operating force is supplemented by hydraulic operating force, and having a pressure differential power cylinder characterized by a hydraulic chamber closed at one end and open at the other, a hydraulic cylinder mounted coaxially on the closed end of said hydraulic chamber and having a fluid pressurizing chamber provided with a discharge port, a pressure-responsive wall having a normal released position and movably disposed in said hydraulic chamber and dividing the same into a variable pressure receiving control chamber and a variable static hydraulic chamber, a source of pressurized fluid, a pressure-transmitting member acted on by one side of said wall, comprising an axially-bored outer valve member projecting from the opposite side of said wall and movable as a unit therewith; a piston-like member formed on said pressure-transmitting member and projecting into said pressurizing chamber to pressurize the fluid therein; an operator-operated valve control member slidably disposed in the axial bore of said outer valve member; a fluid connection between said control chamber and a portion of said valve control member to relay to the latter member a diminutive hydraulic reaction proportional to the effective pressure in said control chamber; a valve return spring compressed between said outer valve member and said valve control member to bias the latter member toward its normal relative position; a pair of abutment-engaging elements carried by said valve members, respectively, in normally spaced relationship defining the relative operating movement of said valve members; a fluid supply reservoir; an intake port between said reservoir and static hydraulic chamber; a compensating port normally open between said pressurizing chamber and said reservoir when said pressure-transmitting member is in fully retracted normal position; a control passage between said control chamber and the axial bore in said outer valve member; an annular valve chamber between said valve members and which is adapted for selective connection to said control passage and to said reservoir, to admit pressurized fluid into said control chamber to move said wall to effect unitary movement of said pressure-transmitting member to pressurize the fluid in said pressurizing chamber and to displace the same through said discharge port, and to block pressurized fluid from entering said control chamber via said control passage and relieve the same for return flow via said control passage into said static hydraulic chamber, respectively; and another spring compressed between the closed end of said static hydraulic chamber and said wall to bias the latter toward normal position.

2. A hydraulic pressure-producing device in which physical operating force is supplemented by hydraulic operating force, and having a pressure differential power cylinder mounted on one end of said power cylinder and having a fluid pressurizing chamber which is provided with a discharge port, a pressure-responsive wall movably disposed in said hydraulic chamber and dividing the same into a variable pressure receiving control chamber and a variable static hydraulic chamber, a source of pressurized fluid, a pressure-transmitting member acted on by one side of said wall, comprising an axially-bored outer valve member projecting from the opposite side of said wall and movable as a unit therewith; a piston-like member formed on said pressure-transmitting member and projecting into said pressurizing chamber to pressurize the fluid therein; an operator-operated valve control member slidably disposed in the axial bore of said outer valve member; a fluid connection between said pressurizing chamber and a portion on said valve control member to relay to the latter member a diminutive hydraulic reaction proportional to the effective pressure in said pressurizing chamber; a valve return spring compressed between said outer valve member and said valve control member to bias the latter member toward its normal relative position; a pair of abutment-engaging elements carried by said valve members, respectively, in normally spaced relationship defining the relative operating movement of said valve members; a fluid supply reservoir; an intake port between said reservoir and said static hydraulic chamber; a compensating port normally open between said pressurizing chamber and said reservoir when said pressure-transmitting member is in fully retracted normal position; a control passage between said pressure receiving chamber and axial bore in said outer valve member; an annular valve chamber between said valve members and which is adapted for selective connection to said control passage and to said reservoir, to admit pressurized fluid into said pressure receiving chamber to move said wall to effect unitary movement of said pressure-transmitting member to pressurize the fluid in said pressurizing chamber, and to displace the same through said discharge port, and to block pressurized fluid from entering said pressure receiving chamber and relieve the same for return flow into said static hydraulic chamber, respectively; and another compressed spring in said static hydraulic chamber between a fixed portion on the interior of said power cylinder and said wall to bias the latter toward normal released position.

3. A hydraulic pressure-producing mechanism for controlling in part the brakes on a vehicle having an engine-driven oil pump provided with an intake port and a pressure delivery port, and an oil sump communicating with said intake port, a source of brake-fluid, a differential pressure power cylinder characterized by a hydraulic chamber, a hydraulic cylinder mounted on one end of said power cylinder and having a brake-fluid pressurizing chamber which is provided with a discharge port, a pressure-responsive wall movably disposed in said hydraulic chamber and dividing the same into a variable pressure receiving chamber and a variable static hydraulic chamber, a pressure-transmitting member acted on by one side of said wall, comprising an axially-bored outer valve member projecting from the opposite side of said wall and movable as a unit therewith; a piston-like member formed on said pressure-transmitting member and projecting into said brake-fluid pressurizing chamber to pressurize the fluid therein; an operator-operated valve control member slidably disposed in the axial bore of said outer valve member to control pressurized delivery of oil to said pressure receiving chamber; a flexible partition member incorporated in said static hydraulic chamber between said wall and said power cylinder to divide said latter chamber into a pair of overlapping static hydraulic chambers, one of said pair of chambers communicating with the intake port of said oil pump and the other of said pair of chambers communicating with said source of brake-fluid, said partition member being capable of axial deformation to expand and contract in accordance with reciprocative axial movements, respectively, of said wall; a fluid connection between said pressure receiving chamber and a portion on said valve control member to relay to the latter member a diminutive hydraulic reaction proportional to the effective pressure in said pressure receiving chamber; a valve return spring compressed between said outer valve member and valve control member to bias the latter member toward its normal relative position; a pair of abutment-engaging elements carried by said valve members, respectively, in normally spaced relationship defining the relative operative movement of said valve members; a passage interconnecting said brake-fluid source and said other of said pair of hydraulic chambers; a compensating port normally open between said brake-fluid pressurizing chamber and said brake-fluid source when said pressure-transmitting member is in fully retracted normal position; a control passage between said pressure receiving chamber and the axial bore in said outer valve member; an annular valve chamber between said valve member and adapted to have selective connection to said control passage and to said oil sump to admit pressurized oil into said pressure receiving chamber to move said wall to effect unitary movement of said pressure-transmitting member to pressurize the fluid in said brake-fluid pressurizing chamber and to displace the same through said discharge port to operate said brakes, and to block pressurized oil from entering said pressure receiving chamber and relieve the same for return flow into said one of said pair of hydraulic chambers, respectively; and another compressed spring in said one of said pair of hydraulic chambers between a fixed portion on the interior of said power cylinder and said wall to bias the latter toward normal position.

4. A hydraulic pressure-producing mechanism for controlling in part the brakes on a vehicle having an engine-driven oil pump provided with an intake port and a pressure delivery port, and an oil sump communicating with said intake port, a source of brake-fluid, a pressure differential power cylinder characterized by a hydraulic chamber, a hydraulic cylinder mounted on one end of said power cylinder and having a brake-fluid pressurizing chamber which is provided with a discharge port, a pressure-responsive wall movably disposed in said hydraulic chamber and dividing the same into a variable pressure receiving chamber and a variable static hydraulic chamber, a pressure-transmitting member acted on by one side of said wall, comprising an auxiliary oil reservoir connected to said oil sump; an axially-bored outer valve member projecting from the opposite side of said wall and movable as a unit therewith; a piston-like member formed on said pressure-transmitting member and projecting into said brake-fluid pressurizing chamber to pressurize the fluid therein; an operator-operated valve control member slidably disposed in the axial bore of said outer valve member to control pressurized delivery of oil to said pressure receiving chamber; a flexible partition member incorporated in said static hydraulic chamber between said wall and said power cylinder to divide said latter chamber into a pair of overlapping static hydraulic chambers, one of said pair of chambers communicating with the intake port of said oil pump and the other of said pair of chambers communicating with said source of brake-fluid, said partition member being capable of axial deformation to accommodate expansion and contraction in accordance with reciprocative axial movements, respectively, of said wall; a fluid connection between said brake-fluid pressurizing chamber and a portion on said valve control member to relay to the latter member a diminutive hydraulic reaction proportional to the effective pressure in said brake-fluid pressurizing chamber; a valve return spring compressed between said outer valve member and valve control member to bias the latter member toward its normal relative position; a pair of abutment-engaging elements carried by said valve members, respectively, in normally spaced relationship defining the relative operative movement of said valve members; a passage interconnecting said brake-fluid source with said other of said pair of hydraulic chambers; a compensating port normally open between said brake-fluid source and said brake-fluid pressurizing chamber when said pressure-transmitting member is in fully retracted normal position; a control passage between said pressure receiving chamber and the axial bore in said outer valve member; an annular valve chamber between said valve members and adapted to have selective connection to said control passage and to said auxiliary oil reservoir to admit pressurized oil into said pressure receiving chamber to move said wall to effect unitary movement of said pressure-transmitting member to pressurize the fluid in said brake-fluid pressurizing chamber and to displace the same through said discharge port to operate said brakes, and to block pressurized oil from entering said pressure receiving chamber and relieve the same for return flow into said one of said pair of hydraulic chambers, respectively; and another compressed spring in said one of said pair of hydraulic chambers between a fixed portion on the interior of said power cylinder and said wall to bias the latter toward normal position.

5. A hydraulic pressure-producing mechanism for controlling in part the brakes on a vehicle having an engine-driven oil pump provided with an intake port and a pressure delivery port, and an oil sump communicating with said intake port via an oil reservoir, a brake-fluid supply reservoir, a pressure differential power cylinder characterized by a hydraulic chamber open at one end and closed at the other, a hydraulic cylinder mounted on the closed end of said hydraulic chamber and having a brake-fluid pressurizing chamber closed at one end with its open end communicating with said hydraulic chamber, and which is provided with a discharge port through its closed end to said brakes, a pressure-responsive wall movably disposed in said hydraulic chamber and serving to divide the same into a variable pressure receiving control chamber and a variable static hydraulic chamber, a pressure-transmitting member acted on by one side of said wall, comprising an axially-bored cylindrically walled outer valve member projecting from the opposite side of said wall and movable as a unit therewith; a piston-like member formed on said pressure-transmitting member and projecting into said brake-fluid pressurizing chamber to pressurize the fluid therein; an operator-operated member; an inner valve control member slidably disposed in the axial bore of said outer valve member to control pressurized delivery of oil to said pressure receiving chamber; a flexible partition member incorporated in said static hydraulic chamber between said cylinders to divide the latter chamber into a pair of variable static hydraulic chambers in concentric overlapping relationship, one of said pair of chambers communicating with said oil reservoir and the other of said pair of chambers communicating with said brake-fluid reservoir, said partition member being capable of deformation to axially contract and expand in accordance with reciprocative axial movements, respectively, of said movable wall, and thereby varying the size of said pair of chambers; a valve return spring compressed between said outer valve member and said valve control member to bias the latter member toward its normal relative position; a pair of abutment-engaging elements carried by said valve members, respectively, in normally spaced relationship defining the relative operative movement of said valve members; an intake passage interconnecting said brake-fluid reservoir with said other of said pair of chambers; a compensating port normally open between said brake-fluid pressurizing chamber and said brake-fluid reservoir when said pressure-transmitting member is in fully retracted normal position; a control passage through the wall of said outer valve member for interconnecting said pressure receiving chamber with said axial bore in said outer valve member; an annular valve chamber between said valve members and which is adapted to selectively control said control passage to admit pressurized oil from said valve chamber into said pressure receiving chamber to move said wall to effect unitary movement of said pressure-transmitting member to pressurize the fluid in said brake-fluid pressurizing chamber to operate said brakes, and to block pressurized oil from entering said pressure receiving chamber from said valve chamber and to relieve said pressurized oil for return flow into said one of said pair of chambers, respectively; and another spring compressed between a fixed portion on said power cylinder and said wall in said one of said pair of chambers, to bias said wall toward normal position.

6. A hydraulic pressure-producing mechanism constructed in accordance with claim 5 including a valve housing processed with a coextensive longitudinal bore coaxial with said wall, and through which said outer valve member slidably projects, an elongated annular oil chamber indented in said housing bore, and which is adapted to have continuous communication with said pressure delivery port in said oil pump, an annular oil channel processed in said housing bore in longitudinally spaced relation to said oil chamber, first and second longitudinally spaced passages through the wall of said outer valve member and which are longitudinally spaced from the aforesaid control passage, first and second longitudinally spaced working lands and a fluid-retaining land on said valve control member, a pair of reduced diameter portions interconnecting said valve lands to produce first and second annular valve chambers, a passage processed in said movable wall to interconnect said first valve chamber with said one of said pair of hydraulic chambers, a pressure reaction chamber provided in the axial bore of said outer valve member between the closed end thereof and spaced confronting end of said fluid-retaining land, a valve return spring compressed in said reaction chamber between the closed end of said axial bore and confronting end of said fluid-retaining land to bias said valve control member relatively to said outer valve member toward normal relative position defined by engagement of said pair of abutment-engaging elements, another pair of abutment-engaging elements carried by said movable wall and confronting portion on said valve housing adapted to close the open end of said power cylinder, to define the fully retracted position of said movable wall and connected outer valve member, a passage processed in said valve housing for interconnecting said reservoir containing oil with said oil channel, said first and second working lands being effective to selectively control said control passage and said valve housing passage communicating with said oil channel to selectively communicate pressurized oil from said second valve chamber through said control passage into said pressure receiving chamber to move said movable wall and to simultaneously block such pressurized oil from entering said oil channel, said first working land being adapted to control said control passage to selectively connect and disconnect said control passage from said first valve chamber, and means for connecting said inner valve control member to said operator-operated member.

7. A hydraulic pressure-producing mechanism constructed in accordance with claim 6 plus another passage processed in the said movable wall to interconnect said pressure receiving chamber with said reaction chamber.

8. A hydraulic pressure-producing mechanism constructed in accordance with claim 7 plus a passage processed in said pressure-transmitting member to interconnect said brake-fluid pressurizing chamber with said reaction chamber.

9. A hydraulic pressure-producing mechanism constructed in accordance with claim 7 in which said movable wall is an actuator piston provided in its periphery with a slip-type piston ring and a lip-type annular pressure seal composed of molded rubber, the latter being exposed to said pressure receiving chamber to effect sealing thereof.

10. A hydraulic pressure-producing mechanism constructed in accordance with claim 9 plus a pair of annular packings provided in complemental internal grooves processed, respectively, in said valve housing bore in spaced relation to said oil chamber and channel, respectively, to effect an oiltight seal between said outer valve member and said valve housing bore.

11. A hydraulic pressure-producing mechanism constructed in accordance with claim 10 in which said brake-fluid pressurizing chamber is processed in a master cylinder body having said oil and brake-fluid reservoirs, the latter reservoir communicating with said brake-fluid pressurizing chamber and other of said pair of hydraulic chambers via said intake passage and compensating port, respectively.

12. A hydraulic pressure-producing mechanism constructed in accordance with claim 5 in which said partition member comprises a cylindrically walled rubber element having a forward open end formed with an annular bead, a radially curving end wall closing the rear end and formed with a central annular bead defining an aperture therethrough, an annular surface groove formed in the closed end of said power cylinder chamber, another annular groove formed in that portion of said pressure-transmitting member adjacent the one side of the aforesaid actuator piston, said annular beads being adapted to engage said grooves, respectively, in oiltight sealing relation to produce said pair of concentric overlapping static hydraulic chambers.

13. A hydraulic-assisted master brake cylinder comprising a source of pressurized fluid; a chamber-defining body provided with a fluid supply reservoir; a cylindrically walled master cylinder having a discharge port; a cylindrically walled actuator cylinder adapted to receive fluid from said reservoir; a control chamber provided in said actuator cylinder, said cylinders being arranged in coaxial tandem relationship; a piston-carrying member movable from a normal position and formed with a pair of pistons in spaced relation and reciprocably disposed in said cylinders, respectively; an outer tubular valve member secured to said actuator piston to move as a unit; an operator-operated valve control member having a normal position and slidably disposed in said outer valve member; two pairs of spaced cooperating fluid-controlling portions carried by said valve members, respectively, for controlling ingress and egress of pressurized fluid into and out of said control chamber to control actuation of said actuator piston; a reaction chamber between said piston-carrying member and said valve control member; a passage processed in said actuator piston for interconnecting one of said fluid-controlling portions with said reservoir when said valve control member is in normal position; a pair of engageable portions on said body and piston-carrying member for establishing normal position of the latter; a valve return spring compressed between said valve members for biasing them toward normal relative positions; and another spring compressed in said actuator cylinder between a different portion on said body and said actuator piston for biasing the latter toward normal position.

14. A hydraulic-assisted master brake cylinder constructed in accordance with claim 13 including another passage processed in said actuator piston for interconnecting said control chamber with said reaction chamber.

15. A hydraulic-assisted master brake cylinder constructed in accordance with claim 13 including another passage processed in said actuator piston for interconnecting said master cylinder with said reaction chamber.

16. A hydraulic-assisted master brake cylinder constructed in accordance with claim 13 including a positive clutch operably incorporated in said actuator piston, and comprising a clutch actuating cylinder, a piston slidably disposed in said clutch cylinder with one side thereof exposed to said control chamber, and the other side thereof provided with a projection movable as a unit therewith, a notch in said projection, an annular recess provided in said piston-carrying member and normally in circular alignment with said notch, a radial bore in said actuator piston interconnecting said notch and recess, a clutch element movably disposed in said radial bore for selective engagement with said notch and recess in response to movement of said clutch piston and connected projection under pressurized oil in said control chamber and spring pressure, respectively, said clutch element being movable into said recess by camming action of said notch to lock said actuator piston and piston-carrying member to move as a unit, a spring compressed between said pistons for supplying the aforesaid spring pressure for actuating said clutch piston to dispose said projection notch in alignment with said clutch element and thereby enabling the latter to disengage from said recess and engage said notch to release said actuator piston from said piston-carrying member for independent operator-movement of the latter, an oil passage between the projection side of said clutch piston and oil supply reservoir to relieve compressive effect on the oil working between said pistons, and another spring compressed between said body and actuator piston for returning the latter toward normal position without interrupting the independent movement of said piston-carrying member.

17. A hydraulic-assisted master brake cylinder for a motor vehicle having an engine, comprising: a chamber-defining body provided with a brake-fluid supply reservoir and an oil supply sump; an engine-driven oil pump for pressure lubricating the working parts of the engine and supplying pressurized actuating oil; a cylindrically walled master cylinder having a discharge port; a cylindrically walled actuator cylinder having a control chamber, said master cylinder being adapted to receive brake-fluid from its reservoir, and said control chamber being adapted to receive actuating oil; a piston-carrying member movable from normal position in a brake-fluid pressurizing direction, and formed with a master cylinder piston and an actuator piston in spaced relationship and reciprocably disposed in said cylinders, respectively; an outer tubular valve member secured to said actuator piston to move as a unit; an operator-operated valve control member having a normal position and slidably disposed in said outer valve member; two pairs of spaced cooperating oil-controlling portions carried by said valve members, respectively, for controlling ingress and egress of pressurized actuating oil into and out of said control chamber to control actuation of said actuator piston; a reaction chamber between said piston-carrying member and said valve control member; a passage processed in said actuator piston for interconnecting one of said oil-controlling portions with said oil reservoir when said valve control member is in normal position; a pair of engageable portions on said body and piston-carrying member, respectively, for establishing normal position of the latter; a valve return spring compressed between said valve members for biasing them toward normal relative positions; and another spring compressed in said actuator cylinder between a different portion on said body and said actuator piston for biasing the latter toward normal position.

18. A hydraulic-assisted master brake cylinder constructed in accordance with claim 17 including another passage processed in said actuator piston for interconnecting said control chamber with said reaction chamber.

19. A hydraulic-assisted master brake cylinder constructed in accordance with claim 17 including another passage processed in said actuator piston for interconnecting said master cylinder with said reaction chamber.

20. A hydraulic pressure-producing mechanism constructed in accordance with claim 4 in which said pressure-responsive wall comprises an actuator piston having an annular clutch cylinder closed at one end and opening into said control chamber, a complemental piston slidably disposed in said clutch cylinder, a spring compressed between said actuator and clutch pistons for biasing the clutch piston toward disengaging position, one side of said clutch piston being continuously exposed to said control chamber, and the other side being normally spaced from and engageable with the closed end of said clutch cylinder, an element connected to the other side of said clutch piston and operably projecting through an opening provided in the closed end of said clutch cylinder, a stop element carried on the outer end of said element for engaging the outer confronting portion on the closed end of said clutch cylinder, to establish said disengaging position of the clutch piston, an annular clutching recess provided in said pressure-transmitting member and normally disposed in circular alignment with a clutching notch provided in said element, a radial bore in said actuator piston interconnecting said clutching recess and notch, a clutch element movably disposed in said radial bore between said clutching recess and notch for selective engagement therewith in response to reciprocable movements of said clutch piston and connected element under pressurized oil effective in said control chamber and spring pressure, respectively, said clutch element being movable inwardly into said clutching recess by camming action from said clutching notch to lock said actuator piston and pressure-transmitting member to move as a unit, a spring compressed between said pistons for supplying the spring pressure aforesaid for moving said clutch piston and connected element to dispose said clutching notch in disengaging position and thereby moving said clutch element outwardly into said clutching notch by camming action from clutching recess, to release said pressure-transmitting member from said actuator piston for independent movement of the former by operator force alone, an oil passage through the closed end of said clutch cylinder for venting the space between said pistons to said one of said pair of hydraulic chambers to prevent compressive effect between said pistons, and another spring compressed between said power cylinder and said actuator piston for returning the latter toward normal position without interrupting independent operator-movement of said pressure-transmitting member.

21. A hydraulic pressure-producing mechanism constructed in accordance with claim 20 in which said pressure-transmitting member is provided with a projection engageable by the closed end of said clutch cylinder for effecting protractive movement of said last-defined member under fluid-pressurized actuation of said actuator piston, said clutching recess when engaged by said clutch element being effective for retractive movement of said last-defined member by said actuator piston under influence of said other spring.

22. A hydraulic-assisted master brake cylinder for a motor vehicle having an engine, comprising a chamber-defining body provided with a brake-fluid supply reservoir and an oil supply sump; an engine-driven oil pump for pressure lubricating the working parts of the engine and supplying pressurized actuating oil for said master cylinder; a cylindrically walled master cylinder; a cylindrically walled actuator cylinder and having a control chamber, said master cylinder being adapted to receive brake-fluid from its reservoir and said control chamber being adapted to receive pressurized oil from said pump; a piston-carrying member movable from normal position in a brake-fluid pressurizing direction and formed with a master cylinder piston spaced from an actuator piston reciprocably disposed in said cylinders, respectively; an outer tubular valve member secured to said actuator piston to move as a unit therewith; an operator-operated valve control member having a normal position and slidably disposed in said outer valve member; two pairs of spaced cooperating oil-controlling portions carried by said valve members, respectively, for controlling ingress and egress of pressurized oil into and out of said control chamber to control actuation of said actuator piston; an annular partition member incorporated between said cylinders to isolate the brake-fluid from said oil, and which is adapted to accommodate relative axial movement of said piston-carrying member with respect to said chamber-defining body; a reaction oil pressure chamber between said piston-carrying member and valve control member; a passage processed in said actuator piston for interconnecting one of said oil-controlling portions with said oil sump when said valve control member is in normal position; a pair of engageable portions on said chamber-defining body and piston-carrying member, respectively, for establishing said normal position of the latter when engaged; a valve return spring compressed between said valve members for biasing them toward normal relative position; and another spring compressed in said actuator cylinder between a portion on said chamber-defining body and said actuator piston for biasing the latter toward normal position.

23. A hydraulic-assisted master brake cylinder for a motor vehicle having an engine, comprising a chamber-defining body provided with a brake-fluid supply reservoir and an oil supply sump; an engine-driven oil pump for pressure lubricating the working parts of the engine and supplying pressurized actuating oil for said master cylinder; a cylindrically walled master cylinder; a cylindrically walled actuator cylinder having a control chamber, said master cylinder being adapted to receive brake-fluid from its reservoir and said control chamber being adapted to receive pressurized oil from said pump; a piston-carrying member movable from normal position in a brake-fluid pressurizing direction and formed with a master cylinder piston spaced from an actuator piston reciprocably disposed in said cylinders, respectively; an outer tubular valve member secured to said actuator piston to move as a unit therewith; an operator-operated valve control member having a normal position and slidably disposed in said outer valve member; two pairs of spaced cooperating oil-controlling portions carried on said valve members, respectively, for controlling ingress and egress of pressurized oil into and out of said control chamber to control actuation of said actuator piston; an annular partition member incorporated between said cylinders to isolate the brake-fluid from said oil, and which is adapted to accommodate relative axial movement of said piston-carrying member with respect to said chamber-defining body; a reaction brake-fluid chamber between said valve control member and said master cylinder; a passage processed in said actuator piston for interconnecting one of said oil-controlling portions with said oil sump when said valve control member is in normal position; a pair of engageable portions on said chamber-defining body and piston-carrying member for establishing said normal position of the latter when engaged, a valve return spring compressed between said valve members for biasing them toward relative normal positions; and another spring compressed in said power actuator cylinder between a portion on said chamber-defining body and said actuator piston for biasing the latter toward normal position.

24. A hydraulic actuator having a chamber-defining body provided with a fluid supply reservoir and a power cylinder in which a complemental piston is reciprocably disposed, and a source of pressurized fluid, said piston having a normal position and serving to divide said power cylinder into a variable pressure control chamber and a variable static hydraulic chamber, a passage between said reservoir and static chamber, comprising an annular clutch chamber formed in said piston and having an open end exposed to said control chamber and a closed end, a complemental piston reciprocably disposed in said clutch chamber; a thrust-transmitting element acted on by the closed end of said first-defined piston; valve control means for selectively controlling pressure flow into said control chamber and relieving the same for return to said reservoir, to control movements of said pistons as a unit and relative to each other; a clutch element carried by said first-defined piston to move as a unit therewith; another clutch element reciprocably disposed in a radial bore in said first-defined piston; a clutching portion on said thrust element selectively engageable by said other clutch element when acted on by said first-defined clutch element as a function of pressure in said control chamber effective to move said clutch piston relatively to said first-defined piston prior to said pressure reaching a magnitude effective to move both pistons as a unit, and thereby connecting the first-defined piston and said thrust element to move as a unit in a thrust-transmitting direction; a spring compressed between said pistons for biasing the clutch piston relatively to said first-defined piston toward disengaging position wherein said first-defined clutch element effects release of said other clutch element for disengagement from said clutching portion on said thrust element and thereby disconnecting said first-defined piston from said thrust element for operator-movement of the latter independently of said first-defined piston in a thrust transmitting direction; and another spring compressed between said power cylinder and first-defined piston for biasing the latter toward normal position.

25. A hydraulic actuator constructed in accordance with claim 24 plus an annular space normally obtaining between said pistons when the clutch piston is fully retracted in disengaging position, and a vent through the closed end of said clutch chamber for interconnecting said space with the aforesaid static hydraulic chamber.

26. A hydraulic actuator having a chamber-defining body characterized by a fluid supply reservoir and a power cylinder in which a complemental piston is reciprocably disposed, and a source of pressurized fluid, said piston having a normal position and serving to divide said power cylinder into a variable pressure control chamber and a variable static hydraulic chamber, a passage between said reservoir and static chamber, comprising a clutch chamber formed in said piston and having an open end exposed to said control chamber and a closed end, a complemental piston reciprocably disposed in said clutch chamber; a thrust-transmitting element acted on by the closed end of said clutch chamber; valve control means for selectively controlling pressure flow into said control chamber and relieving the same for return to said reservoir, to control movements of said pistons as a unit and relative to each other; a clutch element carried by said clutch piston to move as a unit therewith; another clutch element reciprocably disposed in a radial bore provided in said first-defined piston; a clutching portion on said thrust element selectively engageable by said other clutch element when acted on by said first-defined clutch element as a function of pressure in said control chamber effective to move said clutch piston relatively to said first-defined piston prior to said pressure reaching a magnitude effective to move both pistons as a unit, and thereby connecting the first-defined piston and said thrust element to move as a unit in a thrust-transmitting direction; a spring compressed between said pistons for biasing the clutch piston relatively to said first-defined piston toward disengaging position wherein said first-defined clutch element effects release of said other clutch element for disengagement from said clutching portion on said thrust element, and thereby disconnecting said first-defined piston from said thrust element for operator-movement of the latter independently of said first-defined piston in a thrust-transmitting direction; and another spring compressed between said power cylinder and first-defined piston for biasing the latter toward normal position.

No references cited.

MARTIN P. SCHWADRON, *Primary Examiner.*

R. R. BUNEVICH, *Assistant Examiner.*